US00RE36694E

United States Patent [19]

McFarland

[11] E Patent Number: Re. 36,694

[45] Reissued Date of Patent: May 16, 2000

[54] FLUID-DAMPED AUTOMOTIVE DOOR LATCH ACTUATOR

[75] Inventor: Robert W. McFarland, Rochester, Mich.

[73] Assignee: Adac Plastics, Inc., Grand Rapids, Mich.

[21] Appl. No.: 09/173,309

[22] Filed: Oct. 15, 1998

Related U.S. Patent Documents

Reissue of:

[64] Patent No.: 5,743,575
Issued: Apr. 28, 1998
Appl. No.: 08/789,004
Filed: Jan. 27, 1997

[51] Int. Cl.[7] ..... E06B 3/00

[52] U.S. Cl. ..... 292/336.3; 292/DIG. 56; 16/DIG. 6

[58] Field of Search ..... 70/463; 292/336.3, 292/DIG. 56, DIG. 73; 16/DIG. 6

[56] References Cited

U.S. PATENT DOCUMENTS

| | | | |
|---|---|---|---|
| 1,688,472 | 10/1928 | Shaw . | |
| 3,512,210 | 5/1970 | Ratcliffe | 16/139 |
| 4,540,208 | 9/1985 | Logan, Jr. et al. | 292/341.19 |
| 4,897,643 | 1/1990 | Shibata et al. | 340/825.69 |
| 4,907,833 | 3/1990 | Ogasawara et al. | 292/336.3 |
| 4,934,433 | 6/1990 | Aboul-Nasr | 159/43.1 |
| 5,056,838 | 10/1991 | Tiesler et al. | 292/336.3 |
| 5,092,642 | 3/1992 | Lindmayer et al. | 292/336.3 |

*Primary Examiner*—Michael F. Trettel
*Attorney, Agent, or Firm*—Young & Basile, P.C.

[57] ABSTRACT

A fluid-damped automotive door latch actuator comprising a fluid cylinder mounted adjacent the inside surface of an escutcheon plate between the door handle crank arms. A shaft connected to and extending between the crank arms is rotated to actuate the door latch. Damping action is caused in one embodiment by rotation of a shaft-mounted vane relative to a cylinder housing fixed to the escutcheon plate. In a second embodiment, the damper is designed to provide a fluid shearing action.

13 Claims, 3 Drawing Sheets

FLUID-DAMPED AUTOMOTIVE DOOR LATCH ACTUATOR

Matter enclosed in heavy brackets [ ] appears in the original patent but forms no part of this reissue specification; matter printed in italics indicates the additions made by reissue.

FIELD OF THE INVENTION

This invention relates to automotive door latch actuators, commonly called "door handles," and particularly to an automotive door latch actuator which is fluid damped.

BACKGROUND OF THE INVENTION

At the present time the typical automotive door latch actuator comprises an oval or rectangular escutcheon plate fixed to the outer panel of an automotive door assembly. The door assembly is equipped with a latch mechanism to secure the door to the vehicle body. A generally flush handle is mounted in a recess in the escutcheon plate such that it may be manually pulled outwardly and upwardly against the resisting action of a spring to unlatch and open the door.

Because the spring has the power to very abruptly return the handle to the rest position when released, resilient bumpers may be provided to soften the mechanical shock of the handle returning to the rest position. Another approach which reduces the shock and noise associated with door handle release and which enhances the user's perception of automotive quality is to provide a fluid damper which slows the return movement. U.S. Pat. No. 5,092,642, issued Mar. 3, 1992, illustrates a fluid damper in which a lever associated with the door latch actuator is connected through a lost motion connection to a vane-type cylindrical damper so that only a portion of the handle return movement is damped.

SUMMARY OF THE INVENTION

It is the objective of this invention to provide an improved, full-time, fluid-damping mechanism for an automotive door handle which is pivotally mounted for movement relative to a door panel and, or an escutcheon plate carried by a door panel.

In general, this is achieved through the provision of first and second spaced supports which extend inwardly of the door panel and/or escutcheon plate and which carry in rotatable association therebetween a shaft on which a fluid damper is conveniently mounted. The damper may take any of several forms, two of which being disclosed herein, but in all cases comprises a first element which is fixed relative to the door panel, a second element which rotates with the shaft and a quantity of viscous fluid trapped between the first and second element to resist motion of the handle in both directions and at all times.

DETAILED DESCRIPTION OF THE ILLUSTRATIVE EMBODIMENTS

Figure 1:
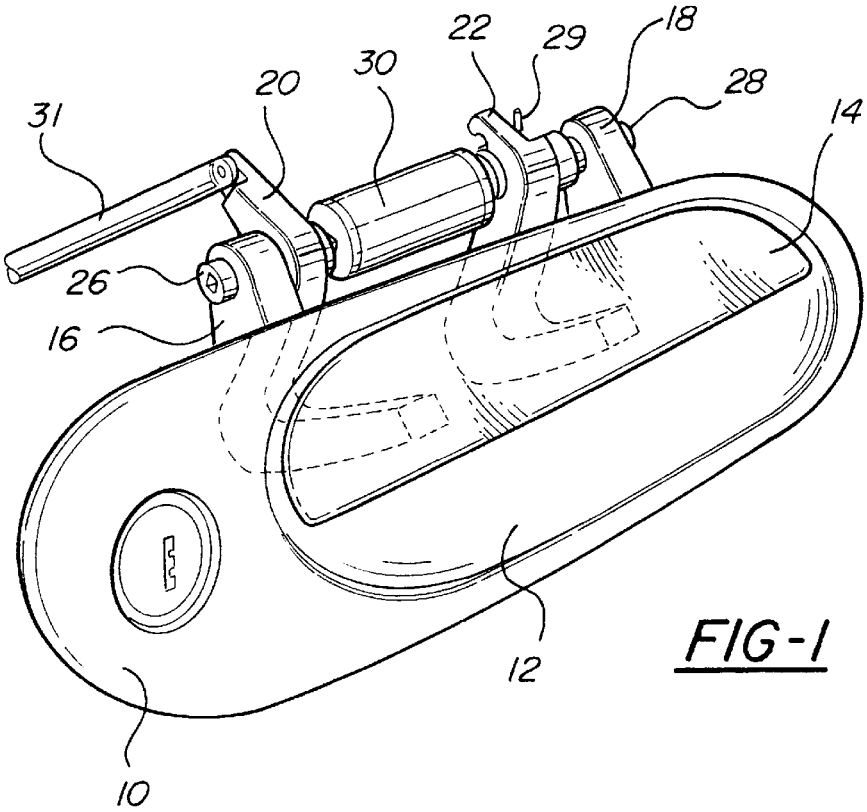
FIG. 1 is a perspective view of an escutcheon and handle assembly incorporating the invention and as seen from the outside surface of the escutcheon plate.
Figure 2:
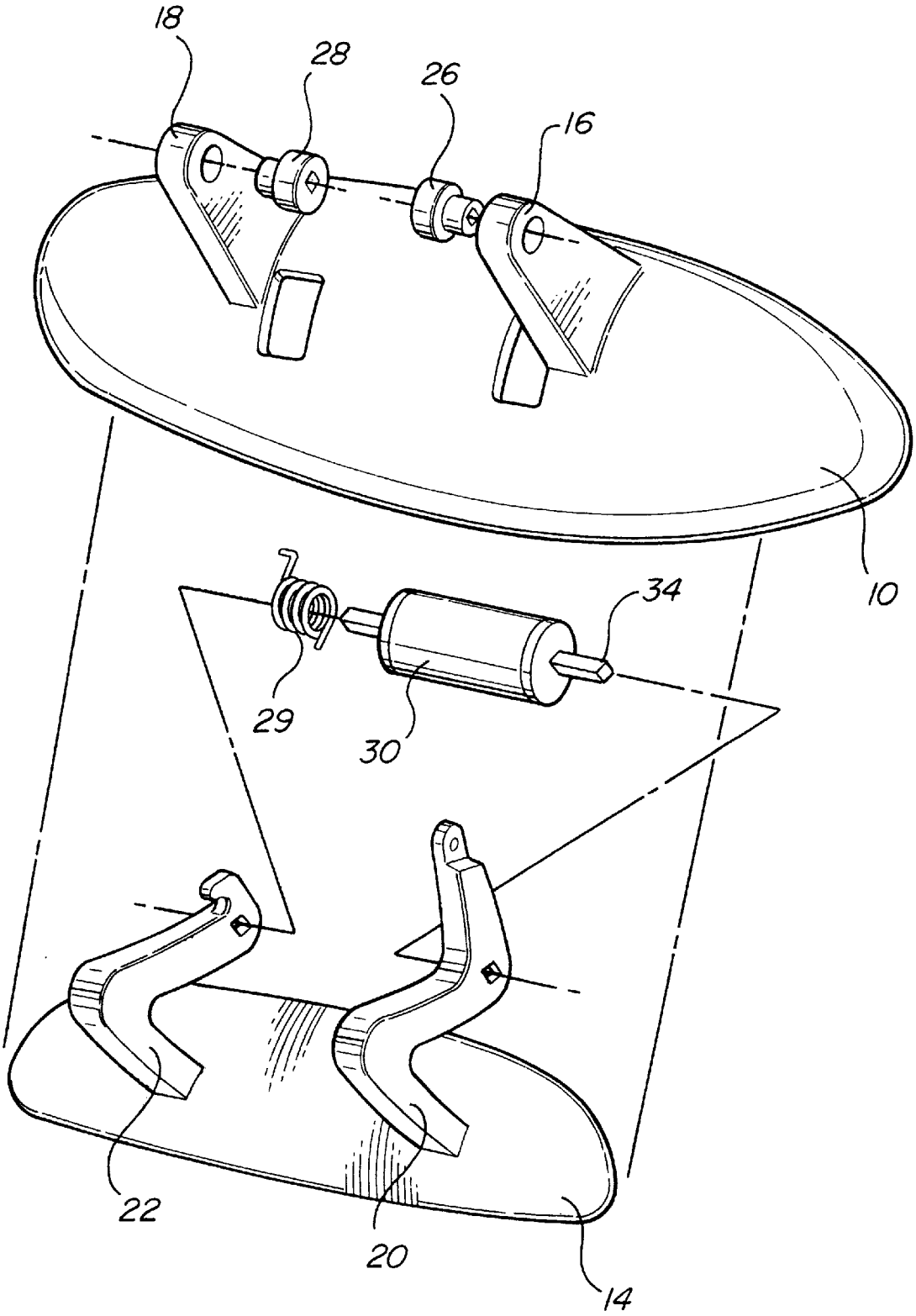
FIG. 2 is an exploded view of the door handle assembly embodiment of FIG. 1 as seen from the interior side of the escutcheon plate.

FIG. 1 shows an automotive door panel escutcheon plate 10 having a concave portion 12 substantially enclosing a manually-operable handle 14 which is typically manually grasped by the user and pulled outwardly and upwardly to unlatch and open the door panel (not shown) within which the escutcheon plate is fixed. As better shown in FIG. 2, lugs 16 and 18 are fixed to the interior surface of the escutcheon plate 10 and extend inwardly of the door assembly to provide first and second spaced parallel supports which are essentially grounded to the body of the automotive vehicle. As also better shown in FIGS. 2–4, pivot arms 20 and 22 acting as crank members are mechanically fixed to the handle 14 and extend through slots in the escutcheon plate 10 so that they are disposed immediately inwardly adjacent the spaced lugs 16 and 18. A metal shaft 24 having a square cross section is rotatably mounted in and to the lugs 18 and 20 by way of bushings 26 and 28. As best shown in FIG. 2, the shaft 24 extends through square openings in the arms 20 and 22 so that the shaft 24 rotates as the arms 20 and 22 are pivoted about the shaft axis. A torsion spring 29 provides a bias which resists rotation of the shaft when the handle 14 is pulled away from the escutcheon plate 10, but assists the return of the handle from an extended position to the rest position.

Figure 3:
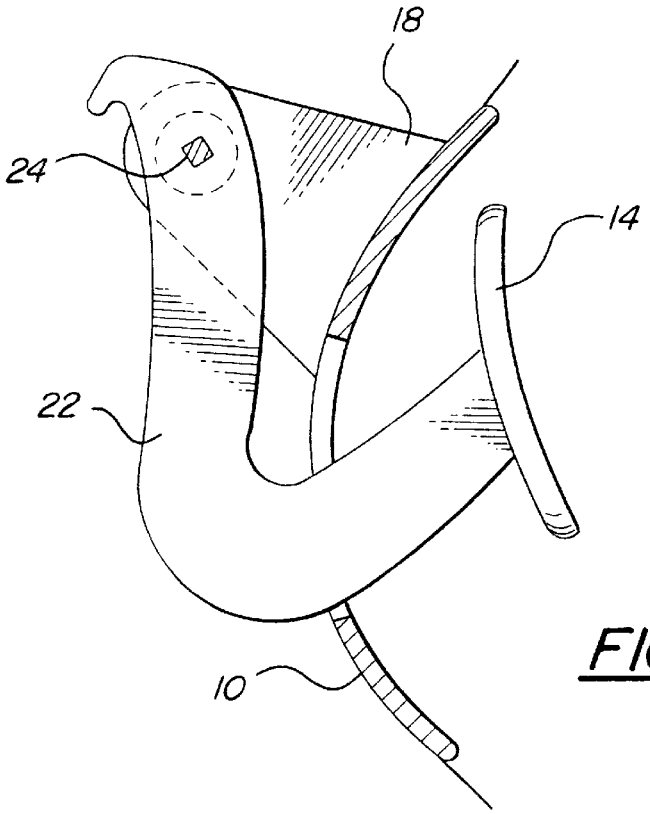
FIG. 3 is a section of the assembly of FIG. 2 taken through the left crank arm as viewed in FIG. 2.
Figure 4:
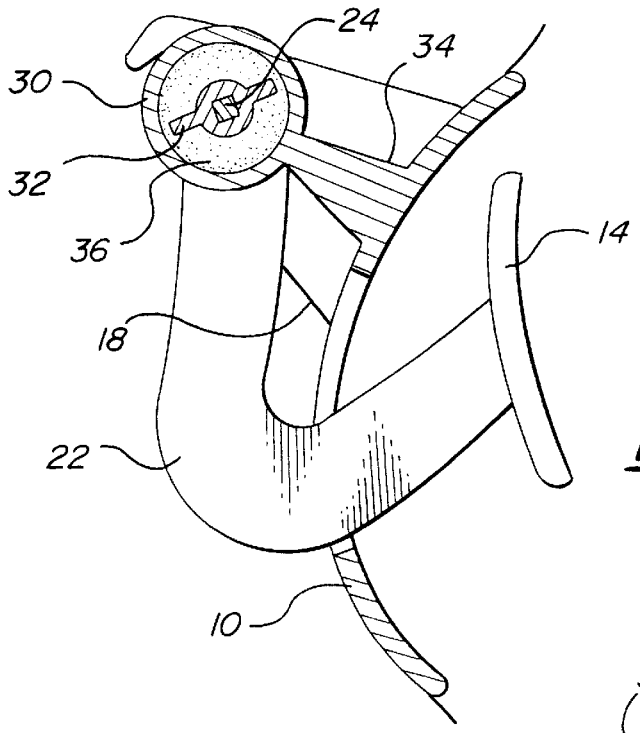
FIG. 4 is a sectional view of the embodiment of FIG. 2 taken through the center of the damper cylinder.
Figure 5:
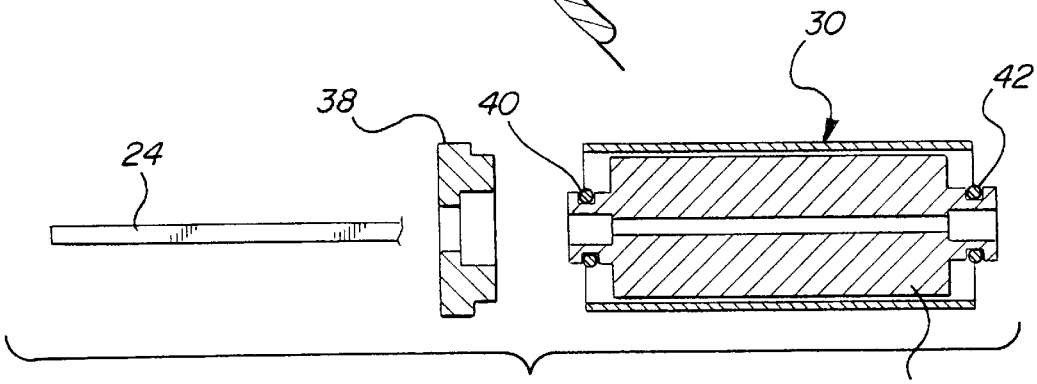
FIG. 5 is an exploded side sectional view of the damper components of the embodiments of FIGS. 1–4.

A fluid-damper 30 of cylindrical configuration is mounted on the shaft 24 between the crank arms 20 and 22. As best shown in FIGS. 3, 4 and 5, the damper 30 comprises an outer cylindrical housing which is anchored at 34 to the escutcheon plate 10 and a vane 32 which is mounted on the shaft 24 for rotation therewith within the cylindrical housing. The space within the housing is filled with a temperature-stable viscous silicone fluid 36. The strength of the damping action is a function of several factors including viscosity and the radial spacing between the ends of the vane 32 and the inner surface of the cylindrical housing. Damping action may, therefore, be varied according to the wishes of the designer.

Figure 6:
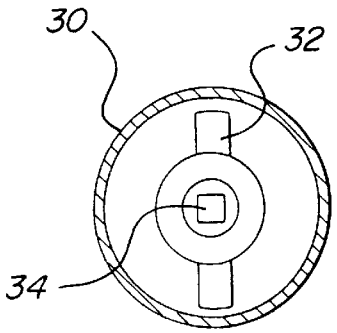
FIG. 6 is an axial section of the damper showing the vane configuration.

As better shown in FIGS. 5 and 6 the damper cylinder 30 is a sealed assembly, the seal being comprised of the end caps 38 (only one is shown, but they are identical) and the O-rings 40 and 42. The shaft 24 passes through the center of the assembly and requires no seal since it not in the fluid chamber.

In operation the handle 14 is extended by manual pressure to rotate the crank arms 20 and 22 counterclockwise as viewed in FIGS. 3 and 4. This counterclockwise pivotal motion of the crank arm 22 rotates the shaft 24 relative to the lugs 16 and 18 to rotate the vane 32 within the viscous fluid 36 within the cylinder 30. All handle motion, whether in the unlatching or in the releasing direction, is fluid-damped to provide a perception of quality and to reduce noise in the operation of the handle. The spring 29 resists the counterclockwise pivotal motion of the crank 22 but aides the clockwise movement. The crank arm 20 is connected by means of a link 31 shown in FIG. 1 to the door latch assembly (not shown) to release it so that the door may be opened in the normal fashion.

Figure 7:
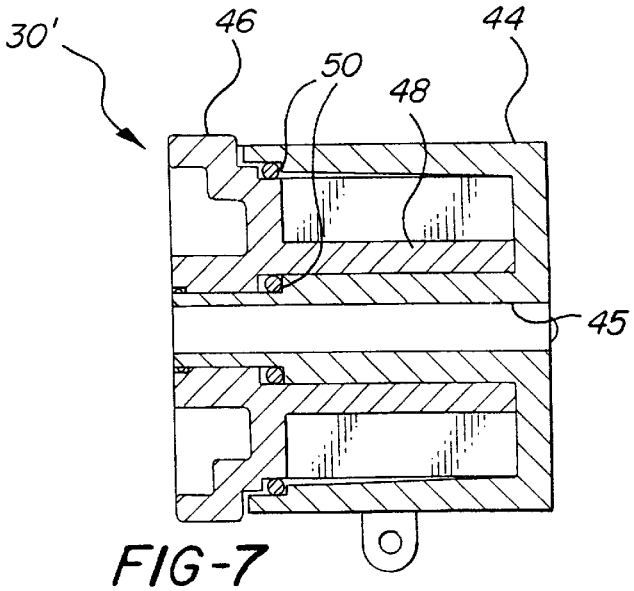
FIG. 7 is a sectional view of an alternative damper assembly.

Referring now to FIG. 7 there is shown an alternative arrangement for the fluid-damper 30'. The fluid-damper 30' comprises an outer cylinder 44 having a square-section through bore 45 to receive the shaft 24 for rotation therewith and an inner cylinder 46 having a central portion 48 which extends concentrically into the cup-shape cavity of the outer cylinder 44. O-rings 50 seal the space between the cylinders 44 and 46 to permit this space to be filled with a viscous silicone type fluid. The damping action in the embodiment of FIG. 7 is largely a function of the mechanical forces required to produce shearing of the damping fluid in the cylindrical-shaped space between the closely mating portions of the cylinders 44 and 46.

Another benefit of the invention is the resistance the dampers 30, 30' provide to inadvertent opening of the door latch in the face of the inertial inputs associated with a side impact accident; i.e., the damper resists movement of the handle 14 relative to the escutcheon plate in both unlatching and release directions, the damping force being greater in response to more abrupt inputs.

A number of variations in the illustrative embodiments will be apparent to persons skilled in the art; e.g., the fixed and moving portions of the damper assembly may be interchanged and the damping action may be a function of either bulk fluid movement or shearing action as illustrated, or both. The escutcheon plate 10 may be integrated with a door or body panel as desired and various aesthetic designs may be adopted for the handle itself without significant effect on the construction or operation of the invention.

In all cases the damper works full time and in both directions, is simply and inexpensively manufactured and occupies minimal space within the door assembly as a result of its location between the escutcheon plate support lugs.

I claim:

1. A fluid-damped automotive door latch actuator comprising:

first and second spaced body supports;

a shaft rotatably mounted between said supports;

a manually operated handle;

at least one crank member connected to said handle and mounted for rotation with said shaft;

bias means for resiliently urging the handle toward a rest position;

a first damper element mounted between said supports and in fixed relationship thereto;

a second damper element mounted on said shaft for rotation therewith relative to said first damper element; and means for trapping a quantity of fluid between said first and second damper elements to damp movements of said handle relative to said body supports.

2. Apparatus as defined in claim 1 wherein the first damper element is a cylinder housing and the second damper element is a vane mounted for rotation on said shaft for rotation within the cylinder housing.

3. Apparatus as defined in clam 1 wherein the first damper element is a first cylinder and the second damper element is a second cylinder concentric with the first, the relationship between said first and second cylinders being such that the fluid trapped therebetween acts in a shear mode to damp relative movement between the cylinders.

4. Apparatus as defined in claim 1 wherein the cross section of said shaft is not round.

5. Apparatus as defined in claim 1 further comprising a second crank member mounted mechanically in parallel with said one crank member.

6. Apparatus as defined in claim 1 further including an escutcheon plate adapted for mounting to an automotive body; said first and second spaced body supports being fixed to said escutcheon.

*7. A fluid damped automotive door latch actuator comprising:*

*a handle mounted for movement between an unlatched position in which the door latch is unlatched and a rest position;*

*first and second relatively moveable damper elements;*

*means for trapping a quantity of fluid between said first and second damper elements; and*

*drive means operative to move the first damper element relative to the second damper element against the resistance of the trapped fluid during at least the initial portion of the movement of the door handle from the rest position to the unlatched position.*

*8. A fluid damped automotive door latch actuator according to claim 7 wherein the drive means is operative to move the first damper element relative to the second damper element against the resistance of the trapped fluid during the entire range of the movement of the door handle from the rest position to the unlatched position.*

*9. A fluid damped automotive door latch actuator according to claim 8 wherein the drive means is further operative to move the first damper element relative to the second damper element against the resistance of the trapped fluid during the entire range of the movement of the door handle from the unlatched position to the rest position.*

*10. A fluid damped automotive door latch actuator according to claim 9 wherein the actuator further includes bias means operative in response to opening movement of the handle to urge the handle toward the rest position.*

*11. A fluid damped automotive door latch actuator comprising:*

*a handle mounted for opening movement from a rest position to an unlatched position in which the door latch is unlatched and return movement from the unlatched position to the rest position;*

*bias means operative in response to opening movement of the handle to urge the handle toward the rest position;*

*first and second relatively moveable damper elements;*

*means for trapping a quantity of fluid between said first and second damper elements; and*

*drive means operative to move the first damper element relative to the second damper element against the resistance of the trapped fluid during the entire range of the opening movement of the door handle from the rest position to the unlatched position and during the entire range of the return movement of the door handle from the unlatched position to the rest position.*

*12. A fluid damped automotive door latch actuator according to claim 11 wherein one of the damper elements comprises a cylinder and the other damper element comprises a vane mounted for rotation in the cylinder.*

*13. A fluid damped automotive door latch actuator according to claim 12 wherein said vane comprises said first damper element.*

* * * * *